(12) United States Patent
Lee

(10) Patent No.: US 8,611,948 B2
(45) Date of Patent: Dec. 17, 2013

(54) SIGNAL PROCESSING APPARATUS

(75) Inventor: Sang Hun Lee, Gyeonggi-do (KR)

(73) Assignee: LG Innotek Co., Ltd., Seoul (KR)

( * ) Notice: Subject to any disclaimer, the term of this patent is extended or adjusted under 35 U.S.C. 154(b) by 754 days.

(21) Appl. No.: 12/375,762

(22) PCT Filed: Jun. 5, 2008

(86) PCT No.: PCT/KR2008/003167
§ 371 (c)(1),
(2), (4) Date: Jan. 30, 2009

(87) PCT Pub. No.: WO2008/156253
PCT Pub. Date: Dec. 24, 2008

(65) Prior Publication Data
US 2010/0087223 A1    Apr. 8, 2010

(30) Foreign Application Priority Data
Jun. 20, 2007    (KR) .................. 10-2007-0060412

(51) Int. Cl.
*H04M 1/00*    (2006.01)

(52) U.S. Cl.
USPC .................................. 455/552.1; 455/553.1

(58) Field of Classification Search
USPC ........ 455/552.1, 101, 103, 127.4, 450, 452.1, 455/553.1, 561, 562.1; 370/328, 334, 335, 370/338, 339, 341, 342
See application file for complete search history.

(56) References Cited

U.S. PATENT DOCUMENTS

| | | | |
|---|---|---|---|
| 6,745,046 B1 * | 6/2004 | Eckert et al. ............... | 455/552.1 |
| 6,813,480 B2 * | 11/2004 | Losser et al. ............... | 455/127.1 |
| 7,057,472 B2 * | 6/2006 | Fukamachi et al. ......... | 333/101 |
| 7,162,266 B2 | 1/2007 | Frank | |
| 2005/0085260 A1 * | 4/2005 | Ella et al. .................... | 455/552.1 |
| 2007/0042802 A1 * | 2/2007 | Park et al. ................... | 455/552.1 |
| 2007/0077898 A1 * | 4/2007 | Mueller et al. ................. | 455/83 |

FOREIGN PATENT DOCUMENTS

| | | |
|---|---|---|
| CN | 1917685 A | 2/2007 |
| JP | 2006-121211 | 5/2006 |
| KR | 10-2003-0078465 | 10/2003 |

OTHER PUBLICATIONS

Office Action dated Dec. 23, 2011 in Chinese Application No. 200880000549.3, filed Jun. 5, 2008.

* cited by examiner

*Primary Examiner* — George Eng
*Assistant Examiner* — Sowmini Nair
(74) *Attorney, Agent, or Firm* — Saliwanchik, Lloyd & Eisenschenk

(57) ABSTRACT

A signal processing apparatus is provided. The signal processing apparatus comprises a plurality of ports which are grouped according to types of signals, in which the signals are grouped according to at least one standard of a communication mode, a frequency use area, a signal band, and a type of a transmission/reception signal.

18 Claims, 4 Drawing Sheets

|  | b | c | d | e | f | g | h | i |
|---|---|---|---|---|---|---|---|---|
| Vc1 | 0 | 0 | 0 | 0 | 1 | 1 | 1 | 1 |
| Vc2 | 0 | 0 | 1 | 1 | 0 | 0 | 1 | 1 |
| Vc3 | 1 | 0 | X | X | X | X | X | X |
| Vc4 | X | X | 1 | 0 | X | X | X | X |

SIGNAL PROCESSING APPARATUS

CROSS-REFERENCE TO RELATED APPLICATION

This application is the U.S. national stage application of International Patent Application No. PCT/KR2008/003167, filed Jun. 5, 2008, the disclosure of which is hereby incorporated by reference in its entirety.

TECHNICAL FIELD

The embodiment relates to a signal processing apparatus.

BACKGROUND ART

A dual-mode terminal is employed to support both GSM (global system for mobile communication)/WCDMA (wideband code division multiple access) service in different communication modes through one terminal.

DISCLOSURE OF INVENTION

Technical Problem

The embodiment provides a signal processing apparatus.
The embodiment provides a signal processing apparatus capable of processing multi-band Tx/Rx signals.
The embodiment provides a signal processing apparatus capable of supporting both GSM/WCDMA service.
The embodiment provides a signal processing apparatus capable of reducing signal routes by using an RF switch chip that processes least selection routes when multi-band Tx/Rx signals are processed.
The embodiment provides a signal processing apparatus capable of improving signal routes and the structure of an additional circuit, thereby enhancing a signal characteristic and minimizing a module size.

Technical Solution

A signal processing apparatus according to the embodiment comprises a plurality of ports which are grouped according to types of signals, in which the signals are grouped according to at least one standard of a communication mode, a frequency use area, a signal band, and a type of a transmission/reception signal, a parallel connection unit connected with the ports which separate the signals and deliver the signals, and a switch unit that performs switching for a route between the parallel connection part and the antenna.

A signal processing apparatus according to the embodiment comprises a switch unit which performs a switching operation for a multi-mode/multi-band transmission/reception signal according to control voltage, first and second parallel connection units connected to the switch unit to selectively transmit the multi-mode/multi-band transmission/reception signal, and a plurality of ports which are connected to the first and second parallel connection units and are grouped according to types of signals, in which the signals are grouped according to at least one standard of a communication mode, a frequency use area, a signal band, and a type of a transmission/reception signal.

A signal processing apparatus according to the embodiment comprises a signal processing apparatus comprising, a switch unit which performs a switching operation for a transmission/reception signal according to control voltage, a parallel connection unit connected to the switch unit to selectively transmit the transmission/reception signal, a first port connected with the parallel connection unit and allocated with a first mode_first band transmission signal and a first mode_second band transmission signal and a second port connected to the parallel connection unit and allocated with a second mode_third band transmission/reception signal and a second mode_fourth band transmission/reception signal.

Advantageous Effects

A signal processing apparatus according to the embodiment performs grouping of signal ports by taking the relationship between frequency bands into consideration and performs switching operation through least routes by using an RF switch chip, which forms parallel connection units according to the grouped ports.

In the signal processing apparatus according to the embodiment, a parallel connection unit is constructed by using the RF switch chip for least routes and element devices, thereby minimizing insertion loss.

The signal processing apparatus according to the embodiment minimizes the insertion loss, thereby improving a signal characteristic.

In the signal processing apparatus according to the embodiment, since a decoder circuit of the RF switch chip can be more simply realized, a circuit size and the manufacturing cost can be reduced.

BEST MODE FOR CARRYING OUT THE INVENTION

Hereinafter, a signal processing apparatus 100 according to the embodiment will be described with respect to accompanying drawings.

The signal processing apparatus 100 according to the embodiment is adaptable for a dual-mode terminal to support GSM (global system for mobile communication)/WCDMA (wideband code division multiple access) service having different communication modes through one terminal.

The signal processing apparatus 100 comprises a front end module connected to an antenna in a GSM/WCDMA terminal.

The front end module is provided by integrating circuits, which selectively process multi-band transmission/reception paths, in one module.

Figure 1:
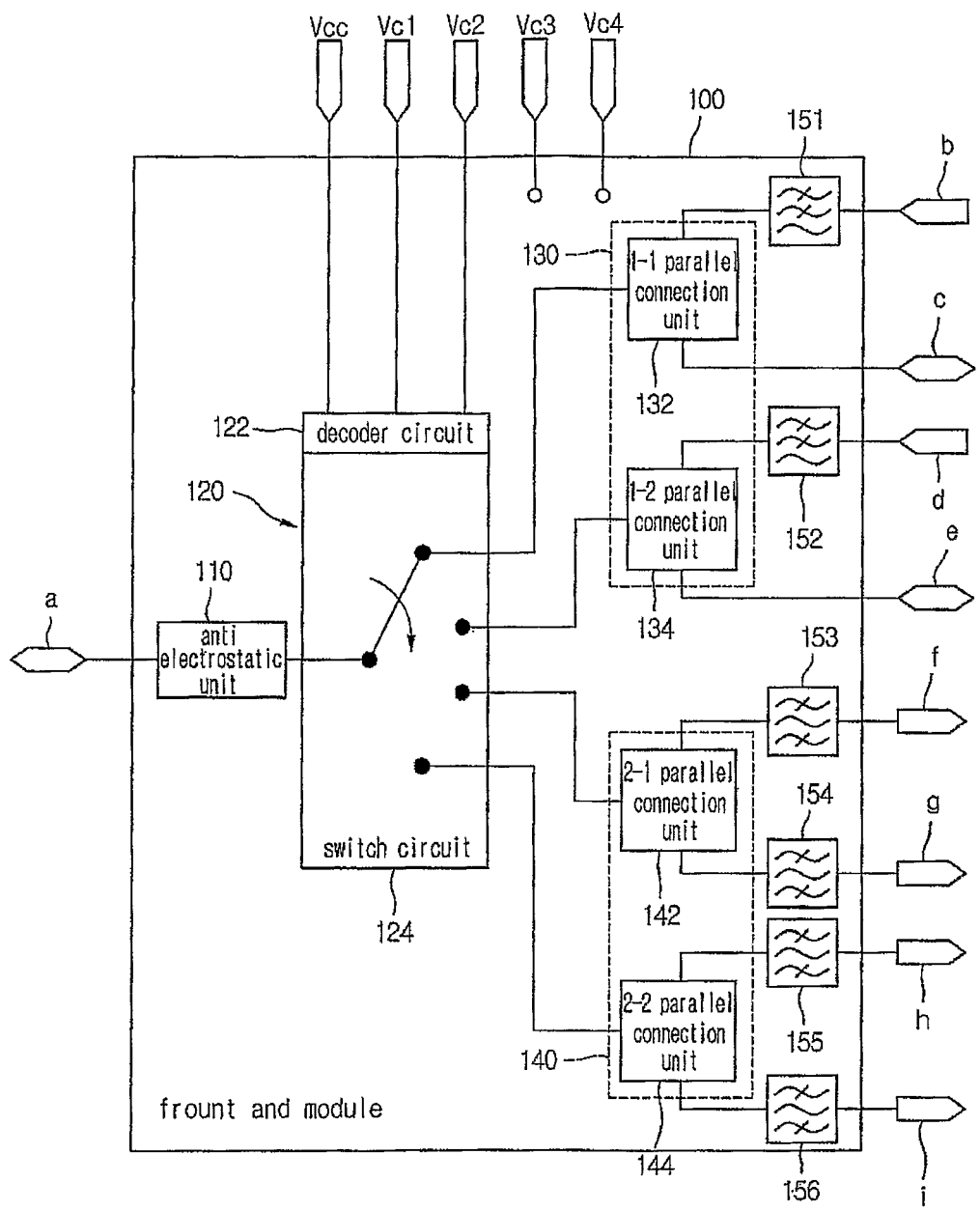
FIG. 1 is a block diagram schematically showing components of a signal processing apparatus according to an embodiment.

FIG. 1 is a block diagram schematically showing components of the signal processing apparatus 100.

Referring to FIG. 1, the signal processing apparatus 100 comprises an anti-electrostatic unit 110, a switch unit 120, a first parallel connection unit 130, a second parallel connection unit 140, a plurality of filters 151 to 156, and a plurality of ports a to i and Vcc, Vc1, Vc2, Vc3, and Vc4.

The switch unit 120 comprises a decoder circuit 122 and a switch circuit 124, and the that parallel connection unit 130 comprises a 1-1 parallel connection unit 132 and a 1-2 parallel connection unit 134.

The second parallel connection unit 140 comprises a 2-1 parallel connection unit 142 and a 2-2 parallel connection unit 144, and six fillets 151 to 156 are provided.

The six filters 151 to 156 are sequentially aligned downward from the upper portion of FIG. 1.

The ports comprises an antenna port a, a voltage source port Vcc, control voltage ports Vc1, Vc2, Vc3, and Vc4, and signal input/output ports b to i.

The signal input/output ports b to i are sequentially aligned downward from the upper portion of FIG. 1

The signal processing apparatus 100 having the above components totally processes 14 signals through the eight signal input/output ports b to i, and the types of the 14 signals are shown in table 1.

TABLE 1

| communication mode | Use area (service provider) | Signal band | Signal type |
|---|---|---|---|
| GSM(1$^{st}$ mode) | North America | 350 MHz (1$^{st}$ band) | Tx signal Rx signal |
|  | Europe | 900 MHz (2$^{nd}$ band) | Tx signal Rx signal |
|  | Europe | 1800 MHz (3$^{rd}$ band) | Tx signal Rx signal |
|  | North America | 1900 MHz (4$^{th}$ band) | Tx signal Rx signal |
| WCDMA (2$^{nd}$ mode) | North America | 850 MHz (5$^{th}$ band) | Tx signal Rx signal |
|  |  | 1900 MHz (6$^{th}$ band) | Tx signal Rx signal |
|  | Europe | 2100 MHz (7$^{th}$ band) | Tx signal Rx signal |

The GSM, which is widely used all over the world including Europe and North America, represents a digital mobile communication mode employing a TDMA (time division multiple access) mode.

The WCDMA, called a UMTS (universal mobile telecommunication system), is based on the GSM communication standard. The WCDMA is a mobile communication mode capable of transmitting a broadband packet-based text or digital multimedia data at the speed of 2 Mbps or more through the combination of a terrestrial wireless communication technology and a satellite transmission technology.

The anti-electrostatic unit 110 is connected to the antenna port a, and protects the switch unit 120 from ESD (electrostatic discharge) from an antenna.

The switch unit 120 is connected to the anti-electrostatic unit 110 through a single line, and connected to the 1-1 parallel connection unit 132, the 1-2 parallel connection unit 134, the 2-1 parallel connection unit 142, and the 2-2 parallel connection unit 144 through four lines.

The switch unit 120 is an RF switch chip manufactured through a semiconductor manufacturing process and comprises an SP4T (single pole 4-through) switch branching into four paths.

The signal processing apparatus 100 can totally process 14 transmission/reception signals as listed in table 1, and the reasons why the switch unit 120 employs the SP4T switch processing only four paths are as follows.

First, the 14 signals are grouped based on factors of a communication mode, a use area (or service provider), a signal band, and a signal type. The detailed description about signal grouping will be made later together with the description about the signal input/output ports b to i and the parallel connection units 132, 134, 142, and 144.

Second, the number of the signal input/output ports b to I and the structure of the parallel connection units 132, 134, 142, and 144 may be designed according to the grouping result.

Third, as the number of the signal input/output ports b to i and the structure of the parallel connection units 132, 134, 142, and 144 are designed, the number of the paths of the switch unit 120 is reduced to four. Accordingly, the switch unit 120 can be realized as the SP4T switch.

Meanwhile, the switch unit 120 comprises the decoder circuit 122 and the switch circuit 124, and is supplied with power through the voltage source Vcc.

The decoder circuit 122 is connected to the first and second control voltage ports Vc1 and Vc2 to receive control voltage through a switching operation.

The decoder circuit 122 performs a logical operation for the combination of the applied control voltages and generates a decoding signal.

The switch unit 124 receives the decoding signal from the decoder circuit 122 and opens/closes four signal paths according to the decoding signal. Accordingly, the antenna port a may be selectively conducted with one of the 1-1 parallel connection unit 132, the 1-2 parallel connection unit 134, the 2-1 parallel connection unit 142, and the 2-2 parallel connection unit 144.

When the signal processing apparatus 100 is employed in a mobile communication terminal, the switch unit 120 may receive the control voltage from a controller provided outside the signal processing apparatus 100, such as a DSP (digital signal processor) of the mobile communication terminal.

As described above, the 14 signals are classified into eight groups based on factors such as a communication mode, a use area, a signal band, and a signal type, and eight signals having been subject to the grouping are allocated to eight ports b to i.

The types of the signals delivered through the signal input/output ports b to i are shown in following table 2.

TABLE 2

| Port number. | Signal type |
|---|---|
| 1 (b). | GSM Tx signal having a band of 850 MHz or 900 MHz. (850_GSM Tx signal, 900_GSM Tx signal). |
| 2 (c). | WCDMA Tx/Rx signal having a band of 1900 MHz, WCDMA Tx/Rx signal having a band of 2100 MHz. (1900_WCDMA Tx signal, 1900_WCDMA Rx signal, 2000_WCDMA Tx signal, 2000_WCDMA Rx signal). |
| 3 (d). | GSM Tx signal having a band of 1800 MHz, GSM Tx signal having a band of 1900 MHz. (1800_GSM Tx signal, 1900_GSM Tx signal). |
| 4 (e). | WCDMA Tx/Rx signal having a band of 850 MHz. (850_WCDMA Tx signal, 850_WCDMA Rx signal). |
| 5 (f). | GSM Rx signal having a band of 850 MHz. (850_GSM Rx signal) |
| 6 (g). | GSM Rx signal having a band of 900 MHz. (900_GSM Rx signal) |
| 7 (h). | GSM Rx signal having a band of 1800 MHz. (1800_GSM Rx signal). |
| 8 (i) | GSM Rx signal having a band of 1900 MHz. (1900_GSM Rx signal). |

Figure 2:
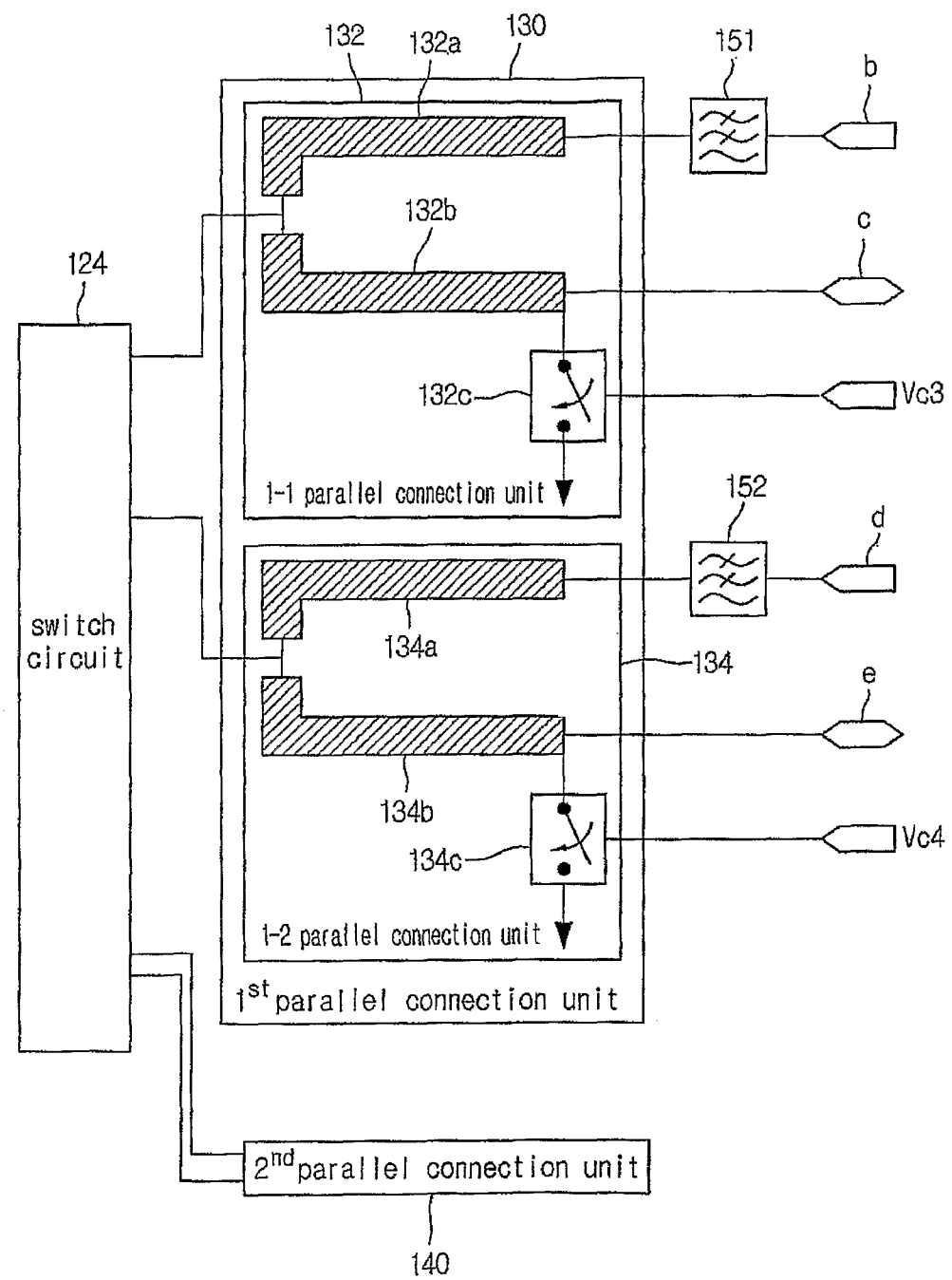
FIG. 2 is a schematic view showing components of the first parallel connection unit according to an embodiment.

Hereinafter, the rule that signals are grouped and allocated to the ports as shown in FIG. 2 will be described with respect to table 1.

The signal processing apparatus 100 comprises the first parallel connection unit 130 and the second parallel connection unit 140 having different signal separation structure. The first parallel connection unit 130 processes GSM Tx signals and WCDMA signals, and the second parallel connection unit 140 processes GSM Rx signals.

The GSM Tx signals comprises an 850_GSM Tx signal, a 900_GSM Tx signal, a 1800_GSM Tx signal, and a 1900_GSM Tx signal, and the WCDMA signals comprises a 850 WCDMA Tx/Rx signal, a 1900_WCDMA Tx/Rx signal, and a 2100_WCDMA Tx/Rx signal.

The GSM Rx signals comprises an 850_GSM Rx signal, a 900_GSM Rx signal, a 1800_GSM Rx signal, and a 1900_GSM Rx signal.

The first parallel connection unit 130 comprises the 1-1 parallel connection unit 132 and the 1-2 parallel connection unit 134. The 1-1 parallel connection unit 132 is connected to the first and second ports b and c, and the 1-2 parallel connection unit 134 is connected to the third and fourth ports d and e.

The second parallel connection unit 140 comprises the 2-1 parallel connection unit 142 and the 2-2 parallel connection unit 144. The 2-1 parallel connection unit 142 is connected to the fifth and sixth ports f and g, and the 2-2 parallel connection unit 144 is connected to the seventh and eighth ports h and i.

The types of the signals allocated to the first to eighth ports b, c, d, e, f, g, h, and i are listed in table 2.

Among the signals, signals having bands adjacent to each other and used in different areas may be allocated to the same port, and the GSM signals (Tx/Rx signals) having bands adjacent to each other and used in the same use area may be allocated to different ports.

Since the 850_GSM Tx signal and the 900_GSM Tx signal allocated to the first port b are used in different use areas, the signals may belong to the same group. The first port b is connected to the 1-1 parallel connection unit 132.

In addition, since the 1900_WCDMA Tx/Rx signal and the 2100_WCDMA Tx/Rx signal allocated to the second port c are used in different use areas, the signals may belong to the same group. The second port c is connected to the 1-1 parallel connection unit 132.

The 1900_WCDMA Tx signal may be separated from the 1900_WCDMA Rx signal, or the 2100_WCDMA Tx signal may be separated from the 2100_WCDMA Rx signal by an external filter connected to the second port c.

As described above, the first and second ports b and c may be connected to the 1-1 parallel connection unit 132 based on signal separation characteristics such as a communication mode, a use area, and a band difference.

In detail, in the 1-1 parallel connection unit 132, signals having different communication modes (GSM and CDMA) are allocated to different ports (first and second ports), and signals, which have bands adjacent to each other and are employed in different use areas, are allocated to the same port. In the case of the signals that are allocated to the first port b and the second port c with different communication modes, it is preferred for the signals to have greater frequency band difference in terms of the signal separation characteristic.

The relationship between signals allocated to the first port b and the second port c corresponds to the relationship between signals allocated to the third port d and the fourth port e.

Since the 1800_GSM Tx signal and the 1900_GSM Tx signal allocated to the third port d are employed in different use areas, the 1800_GSM Tx signal and the 1900_GSM Tx signal may be classified into the same group. The third port d is connected to the 1-2 parallel connection unit 134.

Since the 850_WCDMA Tx/Rx signals allocated to the fourth port e are employed in different use areas, the 850_WCDMA Tx/Rx signals may be classified into the same group. The fourth port e is connected to the 1-2 parallel connection unit 134.

The 850_WCDMA Tx signal may be separated from the 850_WCDMA Rx signal by an external filter connected to the fourth port e.

As described above, the third port d and the fourth port e may be connected to the 1-2 parallel connection unit 132 based on signal separation characteristics such as a communication mode, a use area, and a band difference.

The 1-2 parallel connection unit 134 connected to the third port d and the fourth port e has the same signal separation structure as that the 1-1 parallel connection unit 132 connected to the first port b and the second port c.

The first port b to the fourth port e may be classified into the same group according to the types of grouped signals. In addition, the first port b to the fourth port e may be connected to the first parallel connection unit 130.

Since the 850_GSM Tx signal (the first port b) and the 850_GSM Rx signal have bands adjacent to each other and are employed in the same use area, the 850_GSM Tx signal and the 850_GSM Rx signal are allocated to different ports and processed in different parallel connection units. The 850_GSM Rx signal is allocated to the fifth port f and processed in the 2-1 parallel connection unit 142.

Since the 900_GSM Tx signal (the first port b) and the 900_GSM Rx signal have bands adjacent to each other and are employed in the same use area, the 900_GSM Tx signal and the 900_GSM Rx signal are allocated to different ports and processed in different parallel connection units The 900_GSM Rx signal is allocated to the sixth port g and processed in the 2-1 parallel connection unit 142.

The first parallel connection unit 130 has a signal separation structure different from that of the second parallel connection unit 140, and both the fifth and sixth ports f and g are connected to the 2-1 parallel connection unit 142 in order to employ the signal separation structure of the second parallel connection unit 140.

The 850_GSM Rx signal and the 900_GSM Rx signal are employed in different use areas and have a band difference of about 50 MHz. Thereafter, the fifth and sixth ports f and g may be connected to the 2-1 parallel connection unit according to the above signal separation characteristic.

For reference, the relationship between signals allocated to the seventh and eighth ports h and i correspond to the relationship between signals allocated to the relationship between the fifth and sixth ports f and g.

Since the 1800_GSM Tx signal (the third port d) and the 1800_GSM Rx signal have bands adjacent to each other and are employed in the same use area, the 1800_GSM Tx signal and the 1800_GSM Rx signal are allocated to different ports and processed in different parallel connection units The 1800_GSM Rx signal is allocated to the seventh port h and processed in the 2-2 parallel connection unit 144.

Since the 1900_GSM Tx signal (the third port d) and the 1900_GSM Rx signal have bands adjacent to each other and are employed in the same use area, the 1900_GSM Tx signal and the 1900_GSM Rx signal are allocated to different ports and processed in different parallel connection units. The 1900_GSM Rx signal is allocated to the eighth port i and processed in the 2-2 parallel connection unit 144.

In addition, the 2-2 parallel connection unit 144 connected to the seventh and eighth ports h and i has the same signal separation structure as that of the 2-1 parallel connection unit 142 connected to the fifth and sixth ports f and g.

That is, the fifth to eighth ports f to i are classified into the same group according to the types of grouped signals. In addition, all of the fifth to eighth ports f to i may be connected to the second parallel connection unit 140.

The grouping rule, the signal port allocation rule, and the connection rule (a port grouping rule) between a port and a parallel connection unit of signals, which are not described above, are the same as those of the signals that have been described above, so detailed description thereof will be omitted.

Hereinafter, the structure of the parallel connection units 130 and 140 will be described.

FIG. 2 is a schematic view showing the structure of the first parallel connection unit 130 according to the embodiment.

Referring to FIG. 2, the first parallel connection unit 130 comprises the 1-1 parallel connection unit 132 and the 1-2 parallel connection unit 134.

The 1-1 parallel connection unit 132 is connected to the first port b, the second port c, and the third control voltage port Vc3, and the 1-2 parallel connection unit 134 is connected to the third port d, the fourth port e, and the fourth control voltage port Vc4.

The 1-1 parallel connection unit 132 comprises a first phase shifter 132a and a second phase shifter 132b connected to a switch circuit 124.

The first phase shifter 132a is connected to the first port b to process the 850_GSM Tx signal and the 900_GSM Tx signal, and the second phase shifter 132b is connected to the second port c to process the 1900_WCDMA Tx signal, the 1900_WCDMA Rx signal, the 2100_WCDMA Tx signal, and the 2100_WCDMA Rx signal.

In addition, a first filter 151 is connected between the first phase shifter 132a and the first port b in series, and a first switch circuit 132c is connected between the second phase shifter 132b and the second port c in parallel. The first switch circuit 132c receives a control signal through the third control voltage port Vc3.

According to an embodiment, the phase shift 132a and 132b may be realized in the format of a transmission line such as a micro-strip line, and the first switch circuit 132c may be realized by using a single pole single throw device (SPST). In addition, the first filter 151 may be realized by using a low pass filter (LPF) in order to suppress a harmonic component of a GSM transmission signal.

The first phase shifter 132a and the second phase shifter 132b correspond to the length of ¼ of a WCDMA band-pass frequency in the range of 1900 MHz to 2100 MHz. In the transmission line having the length of ¼, a point distanced from a short point by ¼ is opened. In the same principle, a point distanced from an open point by ¼ is shorted.

Hereinafter, the operation of the 1-1 parallel connection unit 132 will be described.

If the first switch circuit 132c is turned on by a control signal, a point of connecting the second port c to the second phase shifter 132b is shorted, and a point corresponding to ¼ of the WCDMA band-pass frequency, that is, a point of connecting the second phase shifter 132b to the switch circuit 124 is opened.

Accordingly, the switch circuit 124 is connected to the first port b through the first phase shifter 132a and the first filter 151, and the 850_GSM Tx signal and the 900_GSM Tx signal can be transmitted from the first port b to the switch circuit 124.

In contrast, if the first switch circuit 132c is turned off by the control signal, the open occurs between the second port c and the second phase shifter 132b, and the short occurs between the second phase shifter 132b and the switch circuit 124.

Accordingly, the switch circuit 124 is connected to the second port c through the second phase shifter 132b so that Tx signals among the 1900_WCDMA Tx signal, the 1900_Rx signal, the 2100_WCDMA Tx signal, and the 2100_WCDMA Rx signal can be transmitted from the second port c to the switch circuit 124, and Rx signals among them can be transmitted from the switch circuit 124 to the second port c.

In this case, the first phase shifter 132a moves the impedance for a WCDMA band-pass frequency into an infinite point on a smith chart, thereby preventing a WCDMA signal from being introduced into the first port b.

Meanwhile, the 1-2 parallel connection unit 134 comprises a third phase shifter 134a and a fourth phase shifter 134b connected with the switch circuit 124. The third phase shifter 134a is connected with the third port d to process the 1800_GSM Tx signal and the 1900_GSM Tx signal. The fourth phase shifter 134b is connected with the fourth port e to process the 850_WCDMA Tx signal and the 850_WCDMA Rx signal.

In addition, the second filter 152 is connected between the third phase shifter 134a and the third port d in series, and the second switch circuit 134c is connected between the fourth phase shifter 134b and the fourth port e in parallel. The second switch circuit 134c receives a control signal through the fourth control voltage port Vc4.

Since the above 1-2 parallel connection unit 134 operates in the same structure as that of the 1-1 parallel connection unit 132 except for signals, details of the 1-2 parallel connection unit 134 will be omitted.

As described above, through signal grouping, the first port b and the third port d can process GSM signals through their respective parallel connection units 132 and 134, and the second port c and the fourth port e can process WCDMA signals through their respective parallel connection units 132 and 134.

Different from the first parallel connection unit 130, since the second parallel connection unit 140 processes only GSM signals, the second parallel connection unit 140 can be flexibly designed. This will be described below according to two embodiments.

Figure 3:
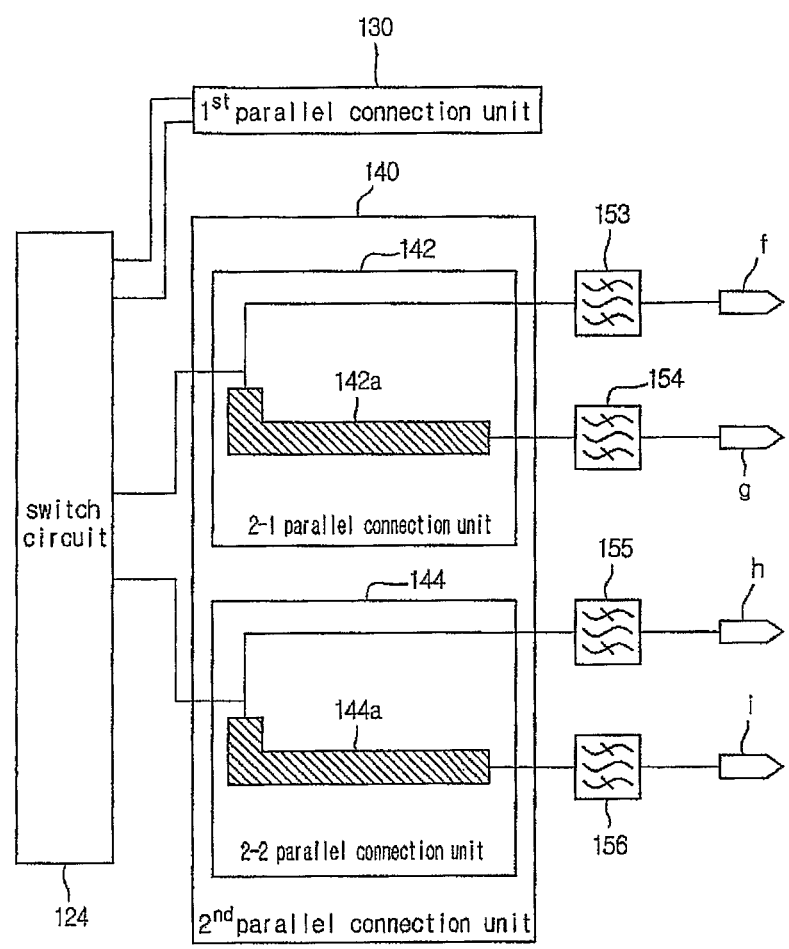
FIG. 3 is a block diagram schematically showing components of the second parallel connection unit according to the first embodiment.

FIG. 3 is a block diagram schematically showing components of the second parallel connection unit 140 according to the first embodiment.

Referring to FIG. 3, the second parallel connection unit 140 comprises the 2-1 parallel connection unit 142 and the 2-2 parallel connection unit 144.

A line connected with the switch circuit 124 branches in the 2-1 parallel connection unit 142. One branch line is connected to the fifth port f, and the other branch line is connected with the sixth port g through the fifth phase shifter 142a.

Similarly, a line connected with the switch circuit 124 branches in the 2-2 parallel connection unit 144. One branch line is connected with the seventh port h, and the other branch line is connected with the eight port i through the sixth phase shifter 144a.

The third filter 153 to the sixth filter 156 are placed at the front stages of the fifth port f to the eighth port i, respectively, and the third filter 153 to the sixth filter 156 comprise surface acoustic wave (SAW) filters in order to suppress a noise component of a GSM Rx signal.

Hereinafter, the operation of the 2-1 parallel connection unit 142 will be described.

The third filter 153 is designed such that input impedance for the 900_GSM Rx signal is positioned at an open point on a smith chart. Accordingly, it is possible to prevent the 900_GSM Rx signal allocated to the sixth port g from being introduced into the fifth port f.

In addition, the fifth phase shifter 142a has the format of a transmission line and a length of ¼ of the band of the 850_GSM Rx signal allocated to the fifth port f.

When viewing the sixth port g from a branch point of the fifth port f and the sixth port g, input impedance for a band-pass frequency in a 850_GSM Rx signal band is moved into an open point on the smith chart so that it is possible to prevent the 850_GSM Rx signal from being introduced into the sixth port g.

Since the above 2-2 parallel connection unit 144 operates in the same structure as that of the 2-1 parallel connection unit 142 except for signals, details of the 2-2 parallel connection unit 144 will be omitted.

As described above, through signal grouping, the fifth port f and the sixth port g can process GSM Rx signals having frequency bands of 850 MHz and 900 MHz, which are employed in different use areas, through the 2-1 parallel connection unit 142. In addition, the seventh port h and the eight port i can process GSM Rx signals having frequency bands of 1800 MHz and 1900 MHz, which are employed in different use areas, through the 2-2 parallel connection unit 144.

Figures 4, 5:
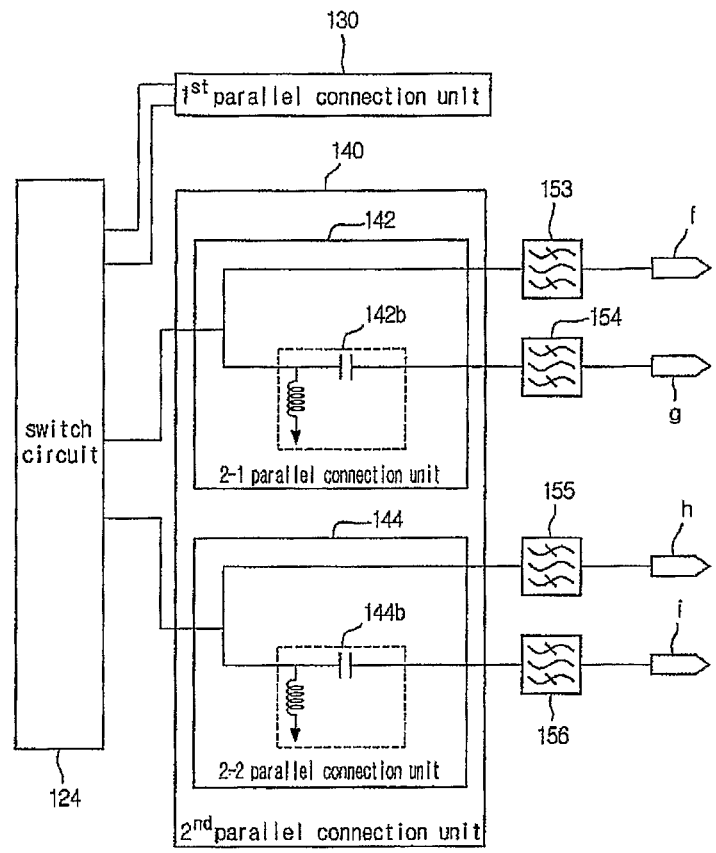
FIG. 4 is a block diagram schematically showing components of the second parallel connection unit according to the second embodiment.
FIG. 5 is a truth table for control voltage according to routes in order to control a switch unit according to an embodiment.

FIG. 4 is a block diagram schematically showing the components of the second parallel connection unit 140 according to the second embodiment.

The second embodiment has the same structure as that of the first embodiment except that the fifth phase shifter 142a and the sixth phase shifter 144a comprise the first high-pass filter 142b and the second high-pass filter 144b, respectively.

The first and second high-pass filters 142a and 144b may be realized in the form of a matching circuit, in which multi-layer ceramic inductor and capacitor are connected to each other in parallel. The operational principles for signals of the fifth port f to the eighth port i are identical to those of the first embodiment.

When the second parallel connection unit 140 is realized according to the first embodiment, insertion loss may be relatively reduced. In addition, when the second parallel connection unit 140 is realized according to the second embodiment, a small number of components may be mounted on the top surface of a substrate, so that a circuit size may be relatively minimized.

The signal processing apparatus 100 according to the embodiment is adaptable for a dual-mode terminal supporting both a GSM mode and a WCDMA mode, and available frequency bands comprise a GSM quad band and a WCDMA triple band, so that a loaming service can be supported all over the world.

FIG. 5 is a truth table used to control the switch unit 120 according to the embodiment.

Referring to FIG. 5, the switching route of the 1-1 parallel connection unit 132, the 1-2 parallel connection unit 134, the 2-1 parallel connection unit 142, and the 2-2 parallel connection unit 144 can be controlled according to the combination of control signals of the first control voltage port Vc1 and the second control voltage port Vc2.

in addition, the switching route of the 1-1 parallel connection unit 132 and the 1-2 parallel connection unit 134 can be controlled according to the combination of control signals of the third control voltage port Vc3 and the fourth control voltage port Vc4. Finally, the signal route of the first port b to the eighth port i can be controlled.

For reference, although "x" of the truth table signifies "don't care", control voltage is preferably set as "0V" in order to minimize current consumed in the signal processing apparatus 100.

The signal processing apparatus 100 according to the embodiment performs grouping signal ports by taking the relationship between frequency bands into consideration, and parallel connection units are constructed according to the grouped ports, so that an RF switch chip may be employed to perform a switching operation for least routes.

Since the parallel connection units can be constructed by using the RF switch chip providing the shortest route and passive elements, an influence by insertion loss is minimized, and a signal characteristic is improved.

In addition, since a decoder circuit of the RF switch chip can be more simply realized, a circuit size and the manufacturing cost can be reduced.

While the invention has been shown and described with reference to certain preferred embodiments thereof, it will be understood by those skilled in the art that various changes in form and details may be made therein without departing from the spirit and scope of the invention as defined by the appended claims.

INDUSTRIAL APPLICABILITY

The signal processing apparatus according to the embodiment can be commonly used in North America and Europe employing different communication modes.

The signal processing apparatus according to the embodiment is adaptable for a dual-mode terminal to support a GSM mode and a WCDMA mode, and available frequency bands comprise a GSM quad band and a WCDMA triple band, so that a loaming service can be supported all over the world.

The invention claimed is:
1. A signal processing apparatus comprising:
a plurality of ports which are grouped according to types of signals, in which the signals are grouped according to at least one standard of a communication mode, a frequency use area, a signal band, and a type of a transmission/reception signal;
a parallel connection unit connected with the ports which separate the signals and deliver the signals;
a switch unit which performs switching for a route between the parallel connection part unit and the antenna; and
an antielectrostatic unit connected between the antenna and the switch unit,
wherein the signals having bands adjacent to each other and used in different areas are allocated to the same port, and
wherein the signals having bands adjacent to each other and used in the same use area are allocated to different ports.

2. The signal processing apparatus according to claim 1, wherein the transmission/reception signals comprise signals of a first band, a second band, a third band, and a fourth band corresponding to a first mode, and signals of a fifth band, a sixth band, and a seventh band corresponding to a second mode, and the ports comprise:
a first port allocated with the first mode_first band transmission signal and the first mode_second band transmission signal;
a second port allocated with the second mode_sixth band transmission/reception signal and the second mode_seventh band transmission/reception signal;

a third port allocated with the first mode_third band transmission signal and the first mode_fourth band transmission signal;

a fourth port allocated with the second mode_fifth band transmission/reception signal;

a fifth port allocated with the first mode_first band reception signal;

a sixth port allocated with the first mode_second band reception signal;

a seventh port allocated with the first mode_third band reception signal; and an eighth port allocated with the first mode_fourth band reception signal.

3. The signal processing apparatus according to claim 2, wherein the first mode and the second mode are a GSM communication mode and a WCDMA communication mode, respectively, the first and fifth bands are a 850 MHz band, the second band is a 900 MHz band, the third band is a 1800 MHz band, the fourth and sixth bands are a 1900 MHz band, and the seventh band is a 2100 MHz band.

4. The signal processing apparatus as claimed in claim 1, wherein the parallel connection unit comprises:

a first parallel connection unit comprising a 1-1 parallel connection unit, which separates signals of first and second ports and delivers the signals, and a 1-2 parallel connection unit, which separates signals of third and fourth ports and delivers the signals; and a second parallel connection unit comprising a 2-1 parallel connection unit, which separates signals of fifth and sixth ports and delivers the signals, and a 2-2 parallel connection unit, which separates signals of seventh and eighth ports and delivers the signals.

5. The signal processing apparatus according to claim 4, comprising a first filter connected between the 1-1 parallel connection unit and the first port; and a second filter connected between the 1-2 parallel connection unit and the third port.

6. The signal processing apparatus according to claim 5, wherein the first and second filters comprise a low pass first.

7. The signal processing apparatus according to claim 4, comprising a third filter connected between the 2-1 parallel connection unit and the fifth port, a fourth filter connected between the 2-1 parallel connection unit and the sixth port, a fifth filter connected between the 2-2 parallel connection unit and the seventh port; and a sixth filter connected between the 2-2 parallel connection unit and the eighth port.

8. The signal processing apparatus according to claim 1, comprising:

a power port connected with the switch unit;

a first control voltage port that applies a control signal to the switch unit; and a second control voltage port that applies a control signal to the switch unit.

9. The signal processing apparatus according to claim 4, wherein the 1-1 parallel connection unit comprises:

a first phase shifter connected between the switch unit and the first port;

a second phase shifter connected between the switch unit and the second port; and a first switch circuit connected between the second phase shifter and the second port in parallel.

10. The signal processing apparatus according to claim 9, comprising a third control voltage port that applies a control signal to the first switch circuit.

11. The signal processing apparatus according to claim 4, wherein the 2-1 parallel connection unit comprises a fifth phase shifter connected between the switch unit and the sixth port.

12. The signal processing apparatus according to claim 1, wherein the switch unit comprises a single pole 4-through (SP4T) RF switch chip.

13. The signal processing apparatus according to claim 7, wherein the third filter is designed such that input impedance for a first mode_second band reception signal is positioned at an open point on a smith chart, and a fifth filter is designed such that input impedance for a first mode_fourth band reception signal is positioned at an open point on a smith chart.

14. A signal processing apparatus comprising:

a switch unit that performs a switching operation for a multi-model multi-band transmission/reception signal according to control voltage;

first and second parallel connection units connected to the switch unit to selectively transmit the multi-model multi-band transmission/reception signal; and a plurality of ports that are connected to the first and second parallel connection units and are grouped according to types of signals, in which the signals are grouped according to at least one standard of a communication mode, a frequency use area, a signal band, and a type of a transmission/reception signals, wherein the signals having bands adjacent to each other and used in different areas are allocated to the same port, and wherein the signals having bands adjacent to each other and used in the same use area are allocated to different ports.

15. The signal processing apparatus according to claim 14, wherein the first parallel connection unit comprises a 1-1 parallel connection unit, in which the 1-1 parallel connection unit comprises:

first and second phase shifters connected to the switch unit; and a first switch circuit connected to the second phase shifter.

16. The signal processing apparatus according to claim 15, comprising a control voltage port that applies a control signal to the first switch circuit.

17. The signal processing apparatus according to claim 14, wherein the second parallel connection unit comprises a 2-1 parallel connection unit, in which the 2-1 parallel connection unit comprises a phase shifter or a high-pass filter having a form of an LC circuit connected to the switch unit.

18. The signal processing apparatus according to claim 14, comprising:

an anti-electrostatic unit which protects the switch unit from static electricity; at least one filter connected between the first parallel connection unit and the port; and at least one filter connected between the second parallel connection unit and the port.

* * * * *